United States Patent [19]

Baer

[11] 3,943,762
[45] Mar. 16, 1976

[54] RAIN GAUGE

[76] Inventor: John Baer, Schooner Head, Bar Harbor, Maine 04609

[22] Filed: Oct. 15, 1974

[21] Appl. No.: 514,407

[52] U.S. Cl. ................................. 73/171; 73/219
[51] Int. Cl.² ..................................... G01W 1/14
[58] Field of Search ............ 73/171, 219; 200/61.04

[56] References Cited
UNITED STATES PATENTS

| | | | |
|---|---|---|---|
| 2,202,452 | 5/1940 | Hildabrand | 73/171 |
| 2,882,726 | 4/1959 | Smith | 73/219 |
| 2,998,722 | 9/1961 | Jaquith | 73/219 |
| 3,243,999 | 4/1966 | Barker | 73/171 |
| 3,705,533 | 12/1972 | Kahl et al. | 73/171 |

FOREIGN PATENTS OR APPLICATIONS

| 277,171 | 3/1967 | Australia | 73/171 |
|---|---|---|---|

*Primary Examiner*—James J. Gill
*Attorney, Agent, or Firm*—Dorfman, Herrell and Skillman

[57] ABSTRACT

A rain gauge comprising a counter and a pivoted bi-stable receiver having two compartments and which is adapted to pivot between first and second limit positions. A collector operates to collect the rainwater and directs it into one or the other of the compartments depending upon where the receiver is positioned. When the operative receiver compartment accumulates a predetermined amount of water, for example water representative of one-tenth of an inch of rainfall, it pivots to the other limit position, placing the other compartment in the operative position, dumping the contents of the first compartment and actuating a counter which registers the increment of rainfall. The actuation of the counter is accomplished by applying an electrical pulse to the counter, the pulse being generated by the pivotal movement of the receiver. The pulse is generated by a sensor cooperating with and sensing receiver movement such as reed switch responsive over the middle range of its movement to a magnet carried by the receiver. Adjustable counterweight means are provided to adjust the balance of the receiver to enable accurate calibration of the gauge.

8 Claims, 5 Drawing Figures

RAIN GAUGE

The present invention relates to rain gauges and is particularly directed to an electronic digital rain gauge in which a counter device registers predetermined increments in the cumulative rainfall.

Rain gauges of this character have previously been available, but there has not been a rain gauge which is of simple structural manufacture as to enable it to be produced in substantial quantities at a reasonable cost and yet which is fully effective and reliable to record the cumulative rainfall.

The present invention provides a rain gauge which is highly economical to produce and assemble and yet which is fully effective and reliable in operation and use.

The invention is characterized by a simple electrical system including a counter, a battery, and battery connectors in a remote recording unit coupled with a reed switch in the measuring unit, the reed switch being operated by a magnet to close the circuit including the battery and the counter momentarily to register a single increment on the counter after each period when a predetermined quantity of rainfall has occurred. A magnetic operator for the reed switch is mounted on a bi-stable pivoted receiver having a pair of compartments which are operable to be alternatively positioned to receive the rainwater and to discharge automatically upon accumulation of a predetermined increment of rainfall, said automatic discharge effecting operation of said reed switch by said magnet.

Furthermore, the arrangement of the measuring unit is such that it operates effectively regardless of the rate at which the rain is falling.

In particular, the present invention provides a rain gauge in which a bi-stable receiver is provided with a magnet which sweeps through a limited angular arcuate path in a vertical plane upon displacement of the bi-stable receiver from one limit position to the other. A reed switch is disposed closely adjacent and parallel to said arcuate path with a pair of overlapping reed elements disposed with their overlapping portions adjacent the mid-point of said arcuate path.

The bi-stable receiver of the rain gauge of the present invention is provided with adjustment means for adjusting the limit positions of the receiver and for adjusting the balance of the receiver to enable calibration of the unit within standard manufacturing tolerances, thereby permitting standard manufacturing techniques without the necessity for the precision assemblies of the prior art.

All of the objects of the invention are more fully set forth hereinafter with reference to the accompanying drawing, wherein.

Figure 1:
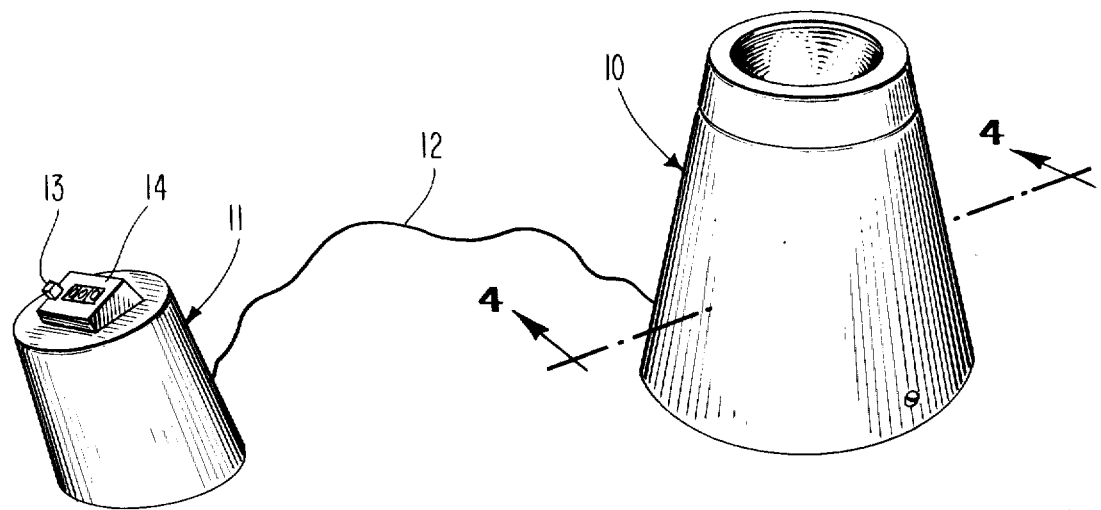
FIG. 1 is a view of a rain gauge unit including a measuring unit and a remote recording unit made in accordance with the present invention.

Referring now to FIG. 1, the rain gauge comprises a measuring unit 10 which is adapted to be mounted in a position to collect the rainfall. A remote recording unit 11 is connected to the measuring unit 10 by a cable 12, the recorder 11 including a counter 14 which is operable to register a count when it is fed a momentary pulse. A reset button is provided at 13 to reset the counter to zero when it is desired to initiate a fresh count.

Figure 2:
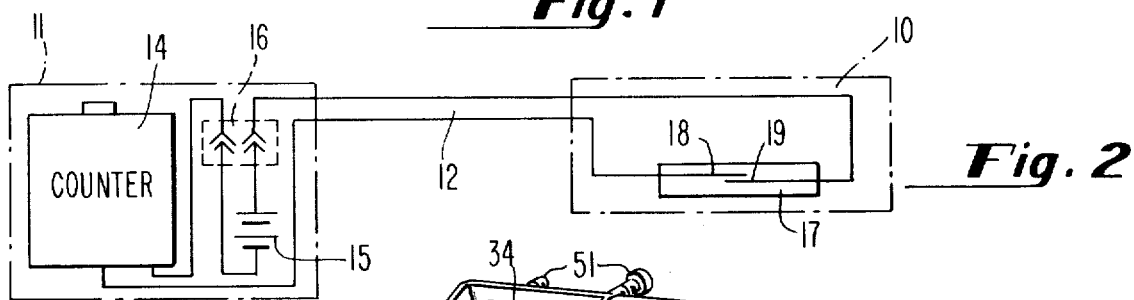
FIG. 2 is a circuit diagram of the electronic components of the gauge.

As shown in FIG. 2, the circuitry of the gauge is simple and comprises a standard counter unit 14 and a battery 15 adapted to be connected into the circuit by a plug-type connector 16 within the recording unit 11. The connecting cable 12 is connected as shown to the elements in the recording unit 11 at one end and is connected to the opposite ends of a reed switch 17 in the measuring unit 10 at the other end. The reed switch 17 in the present instance is an encapsulated unit which includes a pair of reed elements 18 and 19 in the form of resilient flexible leaves of magnetic material which are actuated into momentary engagement by passage of a magnetic field therealong. It is apparent that each momentary closure of the reed switch 17 generates a pulse from the battery 15 which is fed to the counter to actuate its register.

Figure 3:
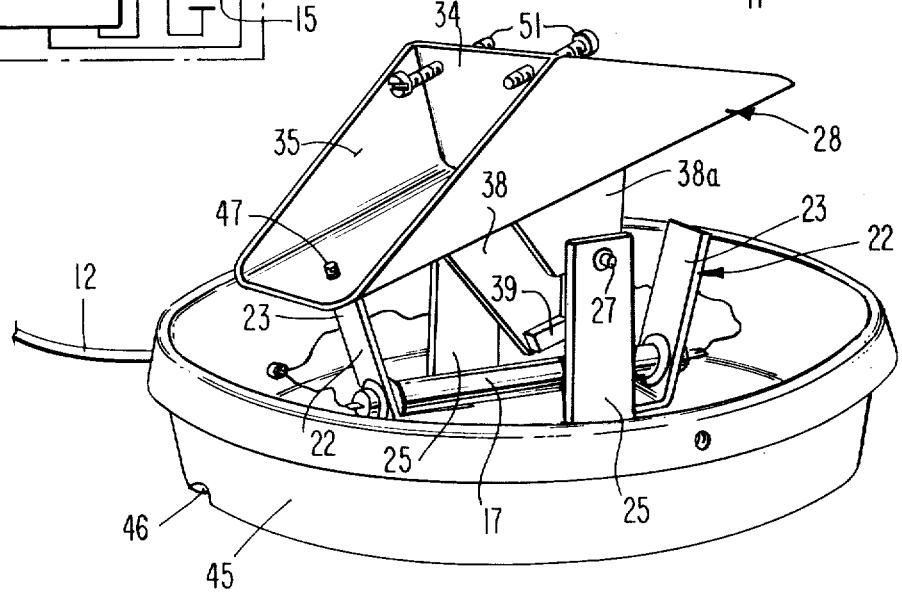
FIG. 3 is a perspective view of the base of the measuring unit with the frustoconical cover removed.
Figure 4:
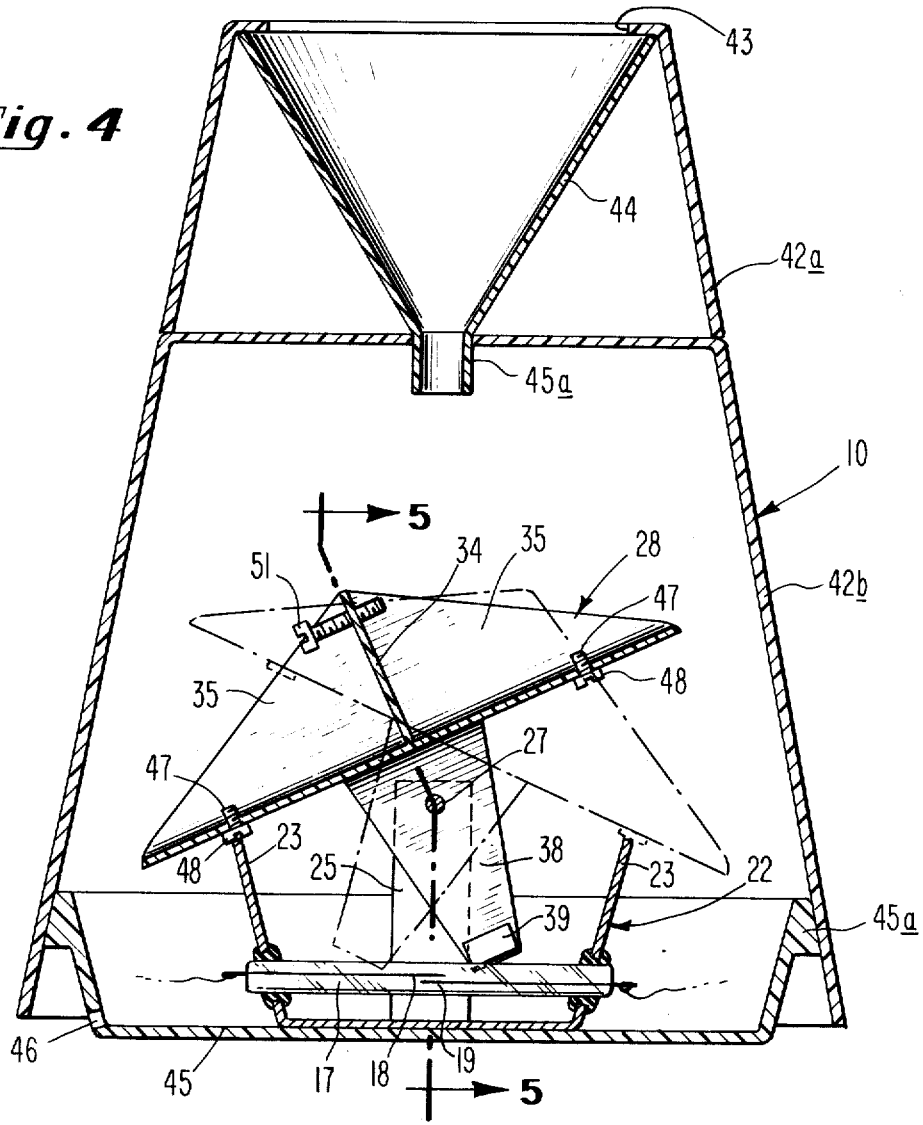
FIG. 4 is a transverse sectional view taken on the line 4—4 of FIG. 1.
Figure 5:
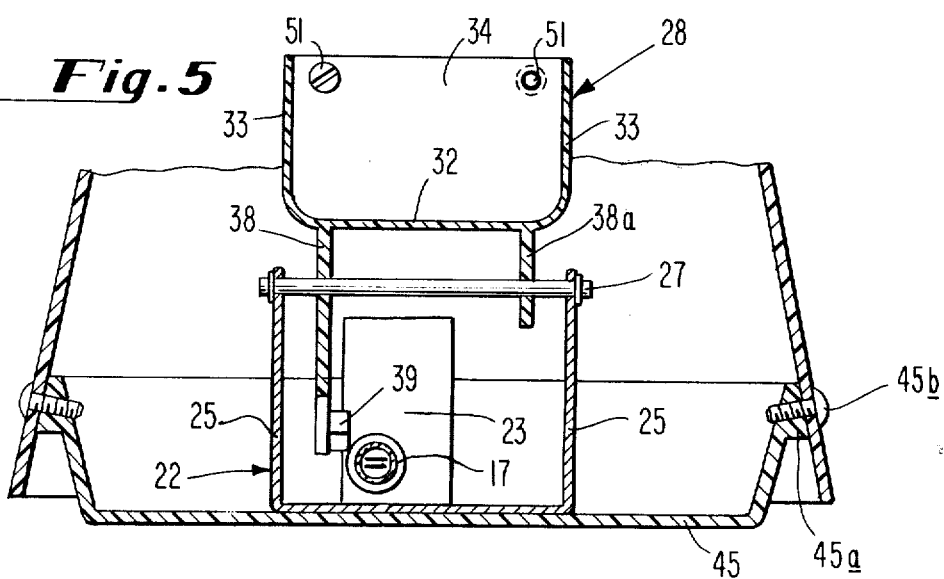
FIG. 5 is a fragmentary sectional view taken on the line 5—5 of FIG. 4.

The mechanism for causing the passage of the magnetic field through the range of the reed switch 17 is best illustrated in FIGS. 3–5. A one-piece member 22 which may be of molded inert plastic material or stamped and formed sheet metal, as shown, provides both stop arms 23 and shaft support columns 25. The reed switch 17 is mounted horizontally between and through insulating and cushioning bushings in upstanding stop arms 23. Between the support columns 25,25, a journal shaft 27 is rotatably supported horizontally above and perpendicular to the vertical plane containing the reed switch. A bi-stable receiver 28 is supported on shaft 27 and thereby pivotally mounted for movement between stable positions against the tops of stops 23, which alternative positions are shown respectively in full and broken lines in FIG. 4.

The receiver 28 is trough-like in form having a substantially flat base portion 32 and upstanding sidewalls 33,33. A medial partition 34 bisects the receiver between the open-ends of the trough to provide a pair of symmetrical compartments 35 and 35. As shown in FIG. 4, the receiver 28 is pivotal between the opposite limit positions in which the base 32 of the trough-like receiver bears alternatively on the left or righthand stop arms 23. To insure bi-stability, the bottom 32 is spaced at an elevated position above the journal shaft 27 by support legs 38 and 38a which extend downwardly from the base. The leg 38 extends substantially below the journal shaft and at its lower end supports a permanent magnet 39. The pivotal movement of the receiver from one bi-stable position to the other causes the magnet to travel in an arcuate path of limited angular extent generally tangent to reed switch 17 between the limit positions shown in FIG. 4. In these limit positions, the magnetic field does not link both reeds. In the mid-point of the arcuate path, however, the magnet passes into close proximity to the overlapping portions of the reed switch leaves 18 and 19 causing the normally open contacts of the switch, the overlapping leaves, momentarily to close to reduce their magnetic reluctance. It will be observed that the simple geometry of the tangent arrangement of the reed switch to the path of movement of the magnet and provision of a relatively long path of movement which need not be, but for simplicity preferably is, arcuately combined to make a simple, highly reliable structure requiring no magnetic shields. In fact the smaller and simpler the permanent magnet the better. The principle is to move a small actuator over a path long relative to the effective range of the sensor.

The measuring unit 10 is operable to collect successive fixed volume increments of water which cause repeated displacement of the receiver from one limit position to the other upon accumulation of predetermined volumes of rainwater alternately in the respective compartments of the receiver. To this end, the measuring unit 10 is provided with a frustoconical cover 42 which terminates at its upper end in a ring whose inner diameter provides a collection opening 43 having a size selected to collect a predetermined quantity of water for each increment of rainfall. For example, a diameter of approximately 2.5 inches in the opening 43 will collect approximately 5 cubic inches of water for each inch of rainfall. The same opening will collect approximately 0.5 cubic inch of water for each one-tenth inch of rainfall. Underlying the opening 43 is a funnel element 44 which is centered over the shaft 27 of the receiver 28 in order to direct the water collected through the opening 43 into whichever one of the compartments 35 is in position to receive the water.

It is preferred to fabricate the receiver 28 and the standard 22 from an inert plastic material which is not subject to corrosion or other damage by rainwater or the atmospheric elements. The plastic is a type which may be inexpensively molded to fairly accurate dimensions and maintains good dimensional stability over its life. In addition to molding the receiver 28 in one piece, the housing and base can be molded of relatively few simple pieces. For various reasons, it may be desirable to have a separate removable funnel 44 so that separation of the cover into two frustoconical pieces 42a and 42b is desirable. Housing piece 42b, if provided with a snug fitting center hole for the funnel spout, will provide indexing means if the funnel in turn nests inside housing piece 42, as shown. The circular pan base 45 may have sheet metal member molded into it or separately fastened to it in different embodiments but is preferably provided with a conforming beveled rim 45a which snugly fits within housing member 42b, as shown, and permits screw connection using screws 45b as seen in FIG. 5. The arrangement provides a smooth contour housing of great simplicity and appealing appearance while at the same time minimizing assembly problems, which consist of putting the switch in place and assembling support columns to the shaft 27, plus adding the magnet 39. The smooth contour and enclosure of the funnel is also functional in that only water entering the opening 43 passes through the funnel into the system. Water outside the opening is diverted down the frustoconical slope of the cover.

The connections of the support legs 38 and 38a are selected in conjunction with the stop arms 23 to position the receiver in each limit position at an angle such that an accumulation of water resulting from a one-tenth inch of rainfall is sufficient to change the center of gravity of the receiver from one side of the journal shaft 27 to the other side and thereby cause the bi-stable receiver to pivot from its one limit position to its other limit position. As shown in FIG. 4, pivotal movement of the receiver from one limit position to the other tilts the bottom or base 32 so as to discharge the water collected in the receiver into the base of the collector. In the present instance, the base of the collector is in the form of a pan 45 having a drain hole 46 for discharging the collected water. Alternate methods for disposing of the collected water may also be provided if desired.

It is apparent that the receiver 28 will remain in either limit position whereby the compartment 35 opposite the supporting stop will receive the water discharged from the funnel 44 by reason of additional rainfall until sufficient water has accumulated to shift its center of gravity to the opposite side of shaft 27. When sufficient water has accumulated in the first receiving compartment, the receiver 28 is displaced to its opposite stable position and water is collected in the second compartment until it shifts back. The operation is repetitive between the two stable positions. Each pivotal movement of the receiver from one limit position to the other causes the magnet 39 to travel in its arcuate path past the sensitive area of the reed switch 17 to thereby momentarily close the switch and generate a pulse to register on the counter.

In order to enable accurate calibration of the collector 10 to generate a pulse for each increment of rainfall, the present invention provides extremely simple adjustment means. To this end, the bottom 32 is provided with an adjustable abutment 48 to engage against each stop arm 23. In the present instance, the abutment 48 consists of a threaded fastener 47 having an enlarged head portion which contacts the upper end of the stop arm 23. The position of each screw 47 determines the stable position of the receiver when that screw contacts its stop. A coarser adjustment is possible where stop arms 23 are of sheet metal, by cutting or bending the ends of the arms to shorten them. Either form of adjustment adjusts the angular limit position of the receiver 28, or the point at which the compartment in operative position will be filled sufficiently to move its center of gravity over the shaft 27 to tilt and dump water in the compartment. It therefore provides precise adjustment of the size of increment of rainfall needed to change receiver position.

Another coarser adjustment may be provided to adjust the center of gravity of the receiver 28. To this end, counter weights are provided in the top of the partition 34 as shown at 51,51. The counter weights in the present instance comprise machine screws having enlarged heads which may be adjusted toward and away from the partition 34 to thereby shift the center of gravity of the bi-stable receiver and thereby vary the amount of water collected in the receiver compartment needed to move the receiver. It should be understood that one or more or all of the counter weights and the adjustable abutments may be omitted if they are found unnecessary in a particular measuring unit.

It should be noted that the present invention provides a rain gauge in which a measuring unit may be placed in a position where it is subject to the elements and a recording unit which may be positioned remotely within a protected area. The only electronic component in the measuring unit is an encapsulated reed switch whereas the counter and battery elements of the electronic circuit are positioned within the recording unit 11. The construction of the measuring unit 10 may be primarily of an inert plastic material without sacrificing precision and reliability since the adjustment means incorporated in the unit enable precise calibration of the unit.

While a particular embodiment of the present invention has been herein illustrated and described, it is not intended to limit the invention to such disclosure but changes and modifications may be made therein and thereto within the scope of the following claims.

I claim:

1. In an electronic rain gauge having a fixed base, a bi-stable receiver movable in a repetitive oscillation pattern relative to said base about a pivotal axis between a pair of stable limit positions and having two complementary compartments each operable to be positioned in operative position to collect rainwater when the receiver is in one of the limit positions and to dump collected rainwater in said other limit position, means to collect rainwater and direct it into said receiver compartments alternatively, the rainwater being directed into one of said compartments when said receiver is in one limit position and into the other of said compartments when said receiver is in the other limit position, said compartments being positioned and dimensioned relative to the pivotal axis of said receiver to shift the center of gravity of said receiver from one side of the pivot axis to the other upon accumulation of a predetermined quantity of rainwater in the operative receiver compartment to thereby pivotally displace said receiver from one limit position to the other limit position, said compartment when displaced to its other limit position operable to dump the rainwater collected therein, a recording unit having a counter, fixed sensing means to sense change in receiver position, and means to transmit a signal to said counter in the recording unit upon said sensing, the improvement in which actuator means is mounted on said receiver to cooperate with said fixed sensing means, and the receiver is a one-piece molded trough-shaped structure having a medial partition dividing the receiver into two symmetrical compartments and integral structure mounting said receiver on said pivotal axis, said structure extending beyond said axis to provide a support for said actuator means.

2. A rain gauge in accordance with claim 1 in which the fixed sensing means is a reed switch and the actuator means is a permanent magnet, said extending structure providing a long lever arm from the pivotal axis so that the magnet's path of movement passes the effective region of the switch and is long compared to that effective region.

3. A rain gauge in accordance with claim 2 in which the magnet follows an arcuate path and the reed switch is arranged generally tangentially to that path.

4. A rain gauge according to claim 1 including two sets of cooperating stop members on the base and the receiver to determine the respective stable limit positions, at least the stop means on the receiver in each set in adjustable in position to change the level of the limit position and thereby adjust the point of shift.

5. A rain gauge according to claim 4 in which the adjustable stop means comprises a threaded element in threaded engagement with said one-piece molded structure.

6. In an electronic rain gauge having a fixed base, a bi-stable receiver movable in a repetitive oscillation pattern relative to said base about a pivotal axis between a pair of stable limit positions and having two complementary compartments each operable to be positioned in operative position to collect rainwater when the receiver is in one of the limit positions and to dump collected rainwater in said other limit position, and means to collect rainwater and direct it into said receiver compartments alternatively, the rainwater being directed into one of said compartments when said receiver is in one limit position and into the other of said compartments when said receiver is in the other limit position, said compartments being positioned and dimensioned relative to the pivotal axis of said receiver to shift the center of gravity of said receiver from one side of the pivot axis to the other upon accumulation of a predetermined quantity of rainwater in the operative receiver compartment to thereby pivotally displace said receiver from one limit position to the other limit position, said compartment when displaced to its other limit position operable to dump the rainwater collected therein, a recording unit including a counter, and sensing means to sense change in receiver positions and means to transmit a signal to said counter in the recording unit upon said sensing, the improvement consisting of providing adjustable position counterweight means carried by said receiver to adjust the center of gravity of said receiver to permit readjustment of the volume of rainwater required in a given compartment to shift the center of gravity to insure displacement of said receiver upon accumulation of said predetermined quantity of rainwater in each compartment wherein said counterweight means includes at least a first threaded element mounted in said receiver for position adjustment generally perpendicularly to a support member simply by turning the threaded element, the weight of said element contributing to the determination of the center of gravity of said receiver.

7. A rain gauge according to claim 6 including at least a second threaded element, said first and second threaded elements being mounted parallel to one another in a medial partition dividing the receiver into two compartments, said threaded elements being adjustable independently of one another.

8. A rain gauge according to claim 7 in which the receiver is a one-piece molded structure and the threaded elements are conventional screws adjustably threaded through said medial partition high in that partition.

* * * * *